United States Patent [19]

Umezawa

[11] Patent Number: 4,980,737
[45] Date of Patent: Dec. 25, 1990

[54] LUMINANCE SIGNAL AND CHROMINANCE SIGNAL SEPARATING CIRCUIT

[75] Inventor: Toshimitsu Umezawa, Saitama, Japan

[73] Assignee: Kabushiki Kaisha Toshiba, Kawasaki, Japan

[21] Appl. No.: 400,459

[22] Filed: Aug. 29, 1989

[30] Foreign Application Priority Data

Sep. 30, 1988 [JP] Japan .................. 63-246931

[51] Int. Cl.$^5$ .............................. H04N 9/78
[52] U.S. Cl. .................................... 358/31
[58] Field of Search ............................ 358/31

[56] References Cited

U.S. PATENT DOCUMENTS 4,489,346 12/1984 Tanaka et al. ................. 358/31

FOREIGN PATENT DOCUMENTS

| 0246878 | 11/1987 | European Pat. Off. . |
| 62-76871 | 4/1987 | Japan . |
| 63-48893 | 3/1988 | Japan . |
| 63-154464 | 6/1988 | Japan . |
| 63-173494 | 7/1988 | Japan . |
| 63-59594 | 11/1988 | Japan . |
| 2163025 | 2/1986 | United Kingdom . |
| 2170975 | 8/1986 | United Kingdom . |

OTHER PUBLICATIONS

Takashi Okada, Masayuki Hongu, Yutaka Tanaka—Flicker-Free Non Interlaced Receiving System for Standard Color TV Signals; IEEE Transactions on Consumer Electronics, vol. CE-31, No. 3, Aug. 1985, pp. 240-254.

Primary Examiner—John W. Shepperd
Attorney, Agent, or Firm—Cushman, Darby & Cushman

[57] ABSTRACT

In this invention, by using first and second 1H delay means, first to third band pass means near 3.58 $MH_H$, first to third polarity inverting means, first to fifth adding means and first to third intermediate value detecting circuits, from a composite video signal fed as an input, a chrominance signal in which no luminance signal component is mixed can be obtained, a chrominance signal having no such resolution reduction as dulling in the vertical direction can be obtained and a luminance signal having no chrominance signal component mixed in and having no such resolution reduction as dulling in the vertical direction can be obtained. Further, a chrominance signal component can be effectively separated in the edge part of a video image in which the luminance variation is large.

47 Claims, 10 Drawing Sheets

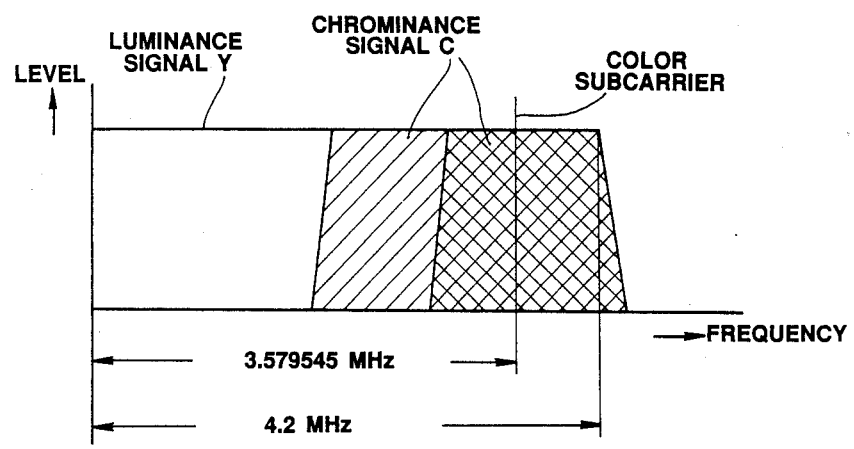
FIG. 10 *(RELATED ART)*
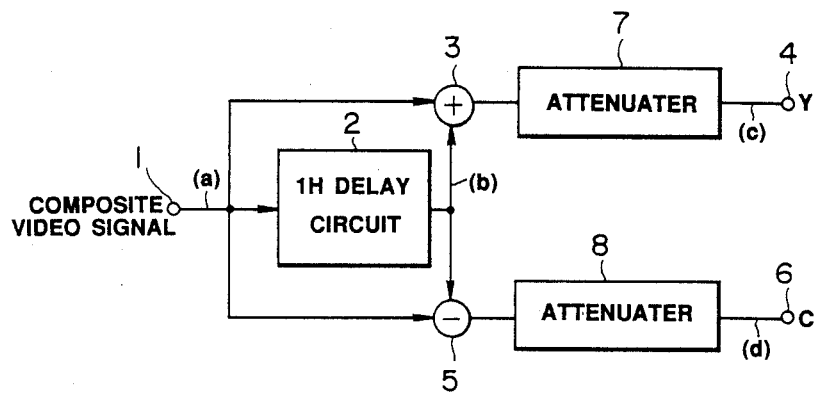
FIG. 11 *(RELATED ART)*

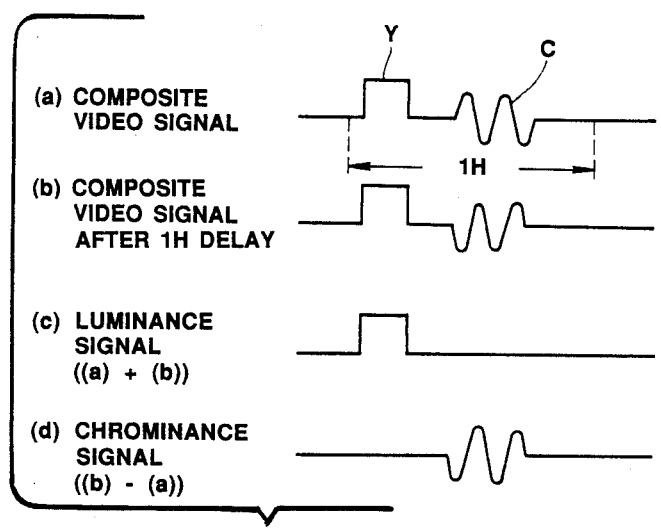
FIG. 12 *(RELATED ART)*
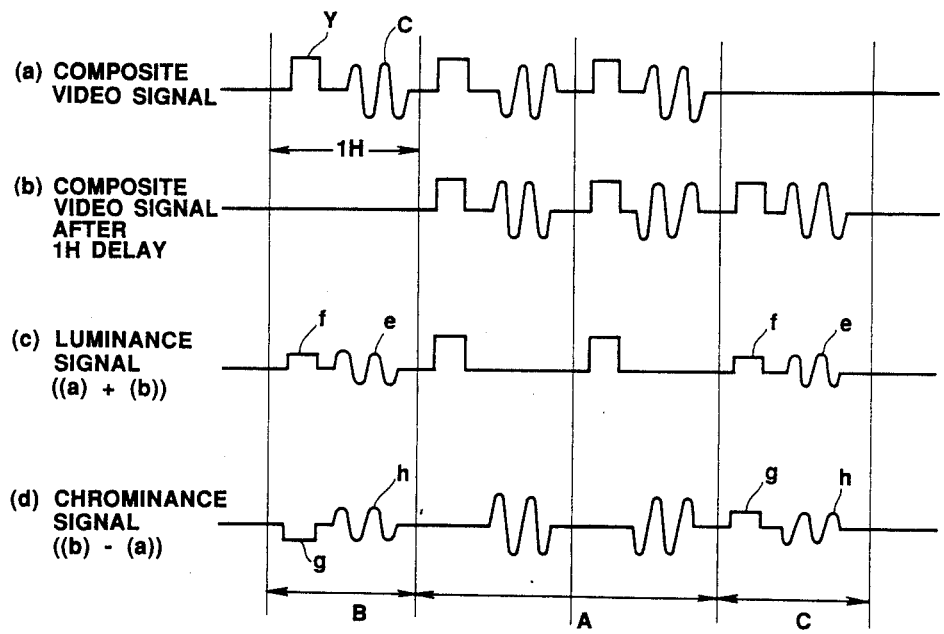
FIG. 13 *(RELATED ART)*

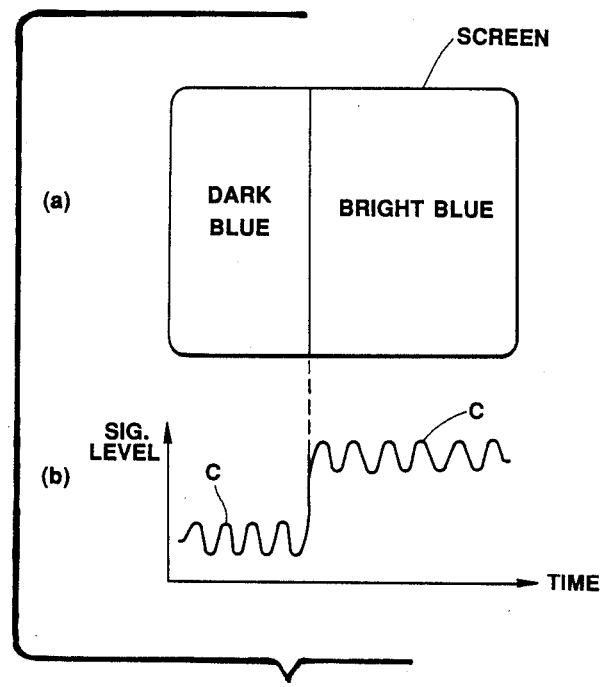
FIG. 14 *(RELATED ART)*

LUMINANCE SIGNAL AND CHROMINANCE SIGNAL SEPARATING CIRCUIT

BACKGROUND OF THE INVENTION:

1. Field of the Invention:

This invention relates to a luminance signal and chrominance signal separating circuit for effectively separating a luminance signal and chrominance signal from a composite video signal, for example, in a color television receiving set. Description of the Related Art:

In an NTSC system which is one of color television signal transmitting systems, primary color signals of red, green and blue are remade into a luminance signal representing the brightness of the picture surface and a chrominance signal having information of a hue and chroma and a composite video signal superimposing both of these signals is transmitted. This is based on the idea that, as a luminance signal is already transmitted for a black and white television receiving set, in order to reproduce a correct color in a color television receiving set, it is necessary to transmit a chrominance signal which will become a primary color signal when added with a luminance signal.

The relation between the color subcarrier for transmitting the chrominance signal and the luminance signal in the above mentioned composite video signal is set to be as shown in FIG. 10 so that no obstruction may be produced between the signals with each other. That is to say, a chrominance signal (C) having 3.57954 $MH_z$ of a subcarrier is inserted into a high band corresponding part of a luminance signal (y) of 0 to 4.2 $MH_z$. Therefore, in order to reproduce a broadcasting signal with a color television receiving set, it is necessary to separate the luminance signal and chrominance signal from each other. There are usually used such two methods of separating the luminance signal and chrominance signal from each other as in the following.

The first is a method by using a trap wherein a composite video signal is passed through a trap of 3.58 $MH_z$ so that the chrominance signal may be absorbed and only the luminance signal may be taken out and the composite video signal is passed through a band pass filter of 3.58 $MH_z \pm 0.5$ $MH_z$ so that the chrominance signal may be taken out.

The second is a method by a comb filter wherein it is utilized that, in an NTSC system, the phase of a color subcarrier is inverted (to be an inverted phase) every horizontal scanning period (which shall be called 1H hereinafter). FIG. 11 shows the formation of a comb filter. In FIG. 12, (a) to (d) show waveforms at respective points (a) to (d) in FIG. 11. However, in FIG. 12, the composite video signal in 1H is represented by a combination of a luminance signal (y) and chrominance signal (C) but the synchronizing signal is omitted for the sake of brevity.

In FIG. 11, the reference numeral 1 represents an input terminal of a composite video signal. The composite video signal input into the terminal 1 is delayed by 1H by a 1H delaying circuit 2 and is added to an adding circuit 3 in which the signal (of the waveform (a)) before being delayed and the signal (of the waveform (b)) delayed by 1H are added together. By this addition, the chrominance signal is canceled and the luminance signal component is taken out. However, the luminance signal component becomes twice as high in the level and is therefore attenuated to be on a ½ level by an attenuator 7 to obtain a luminance signal (y) from an output terminal 4. Also, the composite video signal input into the terminal 1 is delayed by 1H by the 1H delay circuit 2 and is added to a subtracting circuit 5 in which the signal (of the waveform (a)) before being delayed is subtracted from the signal (of the waveform (b)) delayed by 1H. By this subtraction, the luminance signal is canceled and the chrominance signal component is taken out. However, the chrominance signal component becomes twice as high in the level and is therefore attenuated to be on a ½ level to obtain a chrominance signal (C) from an output terminal 6.

However, in such conventional luminance signal and chrominance signal separating circuit using the trap or combe filter as is described above, such problems as in the following will occur.

That is to say, when the first method by the above mentioned trap is used, simultaneously with removing the chrominance signal, the high band component of the luminance signal (concretely the component of 3.58 $MH_z$ of the luminance signal) will be also removed, therefore fine pictures will become obscure and the picture quality will reduce.

When the second method by the above mentioned comb filter is used, as shown in FIG. 13(a), in case there are parts having no correlation before and after the 1H of the composite video signal, on the part having a correlation between the composite video signal shown in (a) and the 1H delayed composite video signal shown in FIG. 13(b), after the addition, without removing the high band component (which component is not inverted in the phase in each 1H as different from the chrominance signal) of the luminance signal as in the part A in FIG. 13(c), the chrominance signal will be able to be removed. However, on the parts B and C having no correlation before and after the 1H, the chrominance signal component (represented by the reference symbol e in the drawing) will remain in the luminance signal and dots will be produced in the edge part of the picture image to the disadvantage. Also, the luminance signal itself will be of an amplitude ½ (represented by the reference symbol f in the drawing) as large as in the part A in the parts B and C and the reproduced picture image will be a dull picture image having an expansion in the vertical direction.

FIG. 13(d) shows a chrominance signal by a subtraction. Still, in the parts B and C, the luminance signal component (represented by the reference symbol g in the drawing) will remain in the chrominance signal, a cross color will be produced in the edge part of the picture image to the disadvantage, the same as in the luminance signal, the chrominance signal itself will be also of an amplitude ½ (represented by the reference symbol h in the drawing) as large as in the part A and the reproduced picture image will be a dull picture image having an expansion in the vertical direction.

Therefore, in order to solve the above mentioned defects, the present applicant has suggested a luminance signal and chrominance signal separating circuit by a comb filter (mentioned in a Japanese patent application No.154464 filed on June 21, 1988) wherein, even in case there are parts having no correlation before and after 1H of a composite video signal, it will be possible to effectively separate a luminance signal and chrominance signal from a composite video signal.

Now, the band of this suggested comb filter depends on the band width of a band pass filter (BPF) near 3.58 $MH_z$. However, in case the comb filter band is taken to be wide, the influence of the luminance component (of a band of 3.58 MHz) will be so large that no sufficient effect will be obtained in some case. That is to say, in case a video image of such large luminance variation as is shown in FIG. 14(a) is displayed on the picture surface, the video signal of its horizontal scanning line will have a chrominance signal C (a blue signal in the drawing) superimposed on the luminance signal varying largely as shown in FIG. 14(b). In such case, in the edge part of the luminance signal, the luminance signal and chrominance signal will simultaneously vary, the luminance signal component of the band of 3.58 MHz and the chrominance signal will simultaneously pass through the BPF, the component of the band of 3.58 MHz of the luminance signal will not be separated but will remain in the boundary part of the color and the chrominance signal component will not be separated but will remain in the edge part of the luminance signal.

As in the above, in the conventional luminance signal and chrominance signal separating circuit, in case a trap is used, there has been a problem that, when the chrominance signal is removed, the high band component of the luminance signal will be also removed. Also, in case a comb filter is used, there has been a problem that, when there are parts having no correlation before and after the 1H of the composite video signal, the luminance signal and chrominance signal will not be able to be perfectly separated or, in the edge part of a video image of a large luminance variation, the chrominance signal component will mix into the separated luminance signal or the luminance signal component will mix into the chrominance signal.

SUMMARY OF THE INVENTION:

The present invention has it as an object to provide a luminance signal and chrominance signal separating circuit wherein a chrominance signal can be removed without removing the high band component of a luminance signal, even in case there are parts having no correlation before and after the 1H of a composite video signal, it will be possible to effectively separate the luminance signal and chrominance signal from the composite video signal and further, even in the edge part of a video image of a large luminance variation, the luminance signal and chrominance signal can be well separated.

That is to say, the first mode of the luminance signal and chrominance signal separating circuit of the present invention comprises a first delaying means for delaying an input composite video signal by one horizontal period to obtain a first delay signal, a first band pass means for inputting the above mentioned composite video signal and passing it near a color subcarrier frequency (of 3.58 MHz), a second band pass means for inputting the above mentioned first delay signal and passing it near a color subcarrier frequency, a first polarity inverting means for inverting the polarity of the output of this second band pass means, a second delaying means for delaying the above mentioned first delay signal further by one horizontal period to obtain a second delay signal, a third band pass means for inputting the above mentioned second delay signal and passing it near a color subcarrier frequency, a second polarity inverting means for inverting the polarity of the output of this third band pass means, a first adding means for adding the output of the above mentioned first band pass means and the output of the above mentioned first polarity inverting means and making the added output ½, a second adding means for adding the output of the above mentioned first polarity inverting means and the output of the above mentioned third band pass means and making the added output ½, a third adding means for adding the output of the above mentioned first band pass means and the output of the above mentioned second polarity inverting means and making the added output ½, a third polarity inverting means for inverting the polarity of the output of this third adding means, a first intermediate value detecting means for inputting the output of the above mentioned first adding means, the output of the above mentioned second adding means and the reference direct current level signal having had the alternating current part removed and detecting the intermediate level of these signals, a second intermediate value detecting means for inputting the output of the above mentioned first adding means, the output of the above mentioned third polarity inverting means and the reference direct current level signal having had the alternating current part removed and detecting the intermediate level of these signals, a third intermediate value detecting means for inputting the output of the above mentioned second adding means, the output of the above mentioned third adding means and the reference direct current level signal having had the alternating current part removed and detecting the intermediate level of these signals, a fourth adding means for adding the output of the above mentioned first intermediate value detecting means, the output of the above mentioned second intermediate value detecting means and the output of the above mentioned third intermediate value detecting means to obtain a chrominance signal in which no luminance signal component is mixed and a fifth adding means for adding the output of this fourth adding means to the above mentioned first delay signal to obtain a luminance signal in which no chrominance signal component is mixed.

In the second mode of the present invention, the first, second and third band pass means in the first mode are arranged respectively in the steps after the first, second and third adding means.

In the third and fourth modes of the present invention, instead of making the respective added outputs ½ in the first, second and third adding means in the first and second modes, the added output is made ½ in the step after the above mentioned fourth adding means.

BRIEF DESCRIPTION OF THE DRAWINGS:

FIG. 10 is an explanatory view for explaining the frequency distribution of a composite video signal of an NTSC system.

FIG. 11 is a block diagram showing an example of a conventional luminance signal and chrominance signal separating circuit.

FIG. 12 is an operation explaining view of FIG. 11.

FIG. 13 is an operation explaining view of FIG. 11 in case there is no correlation before and after the 1H of an input composite video signal.

FIG. 14 is an explanatory view for explaining the problems in another conventional example.

DETAILED DESCRIPTION OF THE PREFERRED EMBODIMENTS

Figure 1:
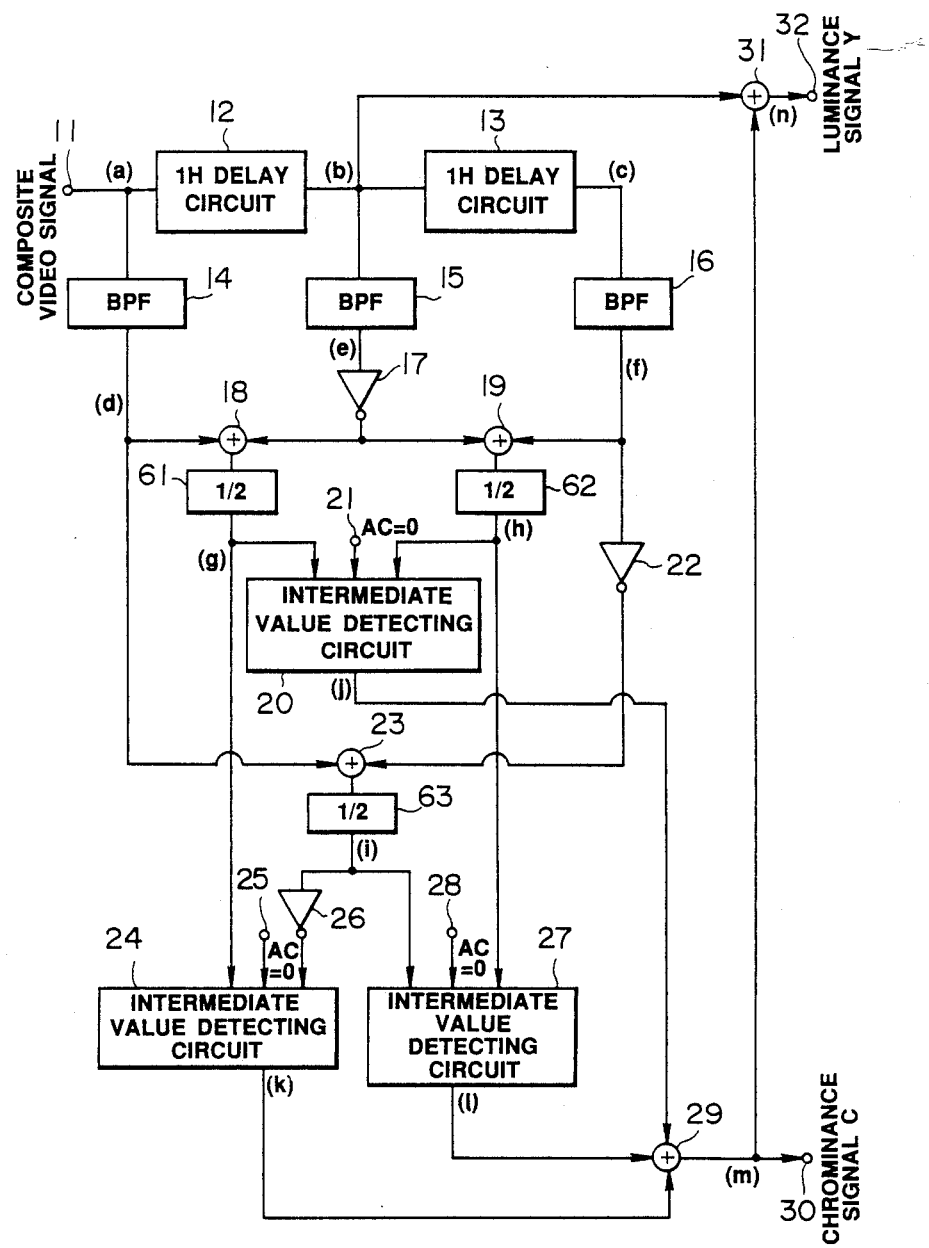
FIG. 1 is a block diagram showing a luminance signal and chrominance signal separating circuit of the first embodiment of the present invention.

FIG. 1 is a block diagram showing the formation of the first embodiment of the present invention.

In FIG. 1, a composite video signal superimposed with a luminance signal and chrominance signal is fed to an input terminal 11. The composite video signal fed to this input terminal 11 is fed to one input end of an adding circuit 31 through a 1H delay circuit 12. The composite video signal output from the 1H delay circuit 12 is fed to a 1H delay circuit 13. Further, the composite video signal fed to the input terminal 11 is input into one input end of an adding circuit 18 and one input end of an adding circuit 23 through a band pass filter (BPF) 14 passing a frequency component (of 3.58 MH$_z$) near a color subcarrier frequency. Also, the composite video signal output from the 1H delay circuit 12 is fed to the other input end of the adding circuit 18 and one input end of an adding circuit 19 through in series a BPF 15 passing the frequency component (of 3.58 MH$_z$) near the color subcarrier frequency and a polarity inverting circuit 17. Further, the composite video signal output from the 1H delay circuit 13 is fed to the other input end of the adding circuit 19 through a BPF 16 passing the frequency component (of 3.58 MH$_z$) near the color subcarrier frequency. Also, the output signal of the BPF 16 is fed to the other input end of the adding circuit 23 through a polarity inverting circuit 22.

The output signal of the above mentioned adding circuit 18 is fed to an intermediate value detecting circuit 20 and intermediate value detecting circuit 24 through an attenuator 61 attenuating the signal to a ½ level. Also, the output signal of the above mentioned adding circuit 19 is fed to the intermediate value detecting circuit 20 and an intermediate value detecting circuit 27 through an attenuator 62 attenuating the signal to a ½ level. Further, the output signal of the above mentioned adding circuit 23 is fed to the intermediate value detecting circuit 27 through an attenuator 63 attenuating the signal to a ½ level. Also, the output signal of the attenuator 63 is fed to the intermediate value detecting circuit 24 through a polarity inverting circuit 26.

Here, the above mentioned intermediate value detecting circuits 20, 24 and 27 are formed by using maximum value circuits and minimum value circuits as described later (See FIG. 2 or 3) and are therefore the same as is disclosed in a Japanese patent application No. 216395 (Japanese patent application laid open No.76871/1987) filed on Sept. 30, 1985 by the present applicant. Each of these intermediate value detecting circuits 20, 24 and 27 outputs an intermediate level signal of three input signals. If the two of the three signals are of the same level, the signal of this level will be output. By the way, a reference direct current level signal (AC=0) having had the alternating current component (AC) removed is applied to control terminals 21, 25 and 28 of each of the intermediate value detecting circuits 20, 24 and 27.

Three output signals from the above mentioned intermediate value detecting circuits 20, 24 and 27 are fed to the adding circuit 29. The output signal of the adding circuit 29 is fed to an output terminal 30. The composite video signal output from the above mentioned 1H delay circuit 12 and the output signal of the adding circuit 29 are fed to an adding circuit 31. The output signal of the adding circuit 31 is fed to an output terminal 32.

Figure 2:
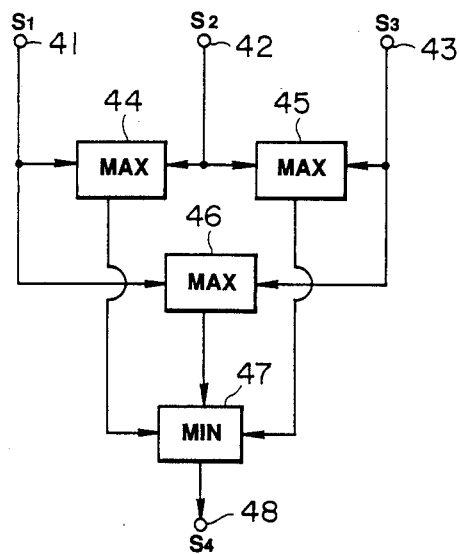
FIG. 2 is a block diagram showing an intermediate value detecting circuit in FIG. 1.

FIG. 2 is a block diagram showing an example of the circuit formation of the above mentioned intermediate value detecting circuit. The intermediate value detecting circuit shown in FIG. 2 is a circuit in which input signals $S_1$, $S_2$ and $S_3$ are fed respectively to three input terminals 41, 42 and 43 and an intermediate level among the levels presented by the input signals $S_1$, $S_2$ and $S_3$ is output as an output signal S. to an output terminal 48 and is formed of three maximum value circuits (MAX) 44, 45 and 46 and one minimum value circuit (MIN) 47. Each of the maximum value circuits 44, 45 and 46 is to selectively output the maximum level among the levels presented by a plurality of inputs. The minimum value circuit 47 is to select the minimum level from among the levels presented by a plurality of inputs.

Figure 3:
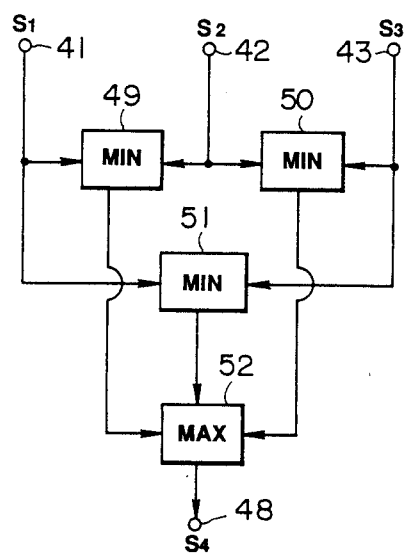
FIG. 3 is a block diagram showing another embodiment of the above mentioned intermediate value detecting circuit.

FIG. 3 shows another embodiment of the circuit formation of the above mentioned intermediate value detecting circuit formed by using three minimum value circuits (MIN) 49 to 51 instead of the three maximum value circuits 44 to 46 in FIG. 2 and using a maximum value circuit (MAX) 52 instead of the minimum value circuit 47 in FIG. 2. Even in this circuit formation, the same as in the case of FIG. 2, an intermediate level among the levels presented by the three input signals $S_1$, $S_2$ and $S_3$ can be output to the output terminal 48.

Figure 4A:
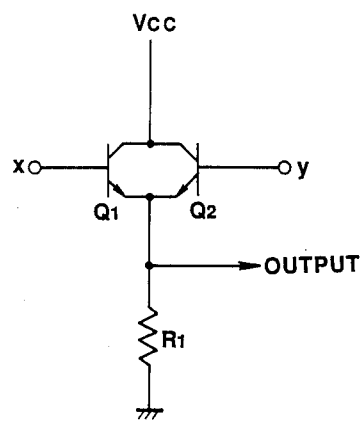
FIGS. 4A and 4B are circuit diagrams showing examples of a maximum value circuit used in the above mentioned intermediate value detecting circuit.
Figure 4B:
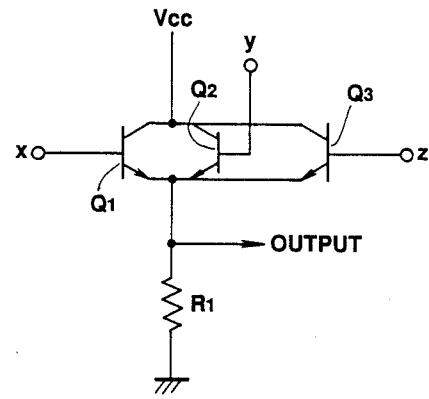

FIG. 4A is a circuit diagram showing an example of the above mentioned maximum value circuits 44 to 46 in which the respective collectors of two NPN type transistors $Q_1$ and $Q_2$ are connected in common, the respective emitters are connected in common, the common collector is connected to a direct voltage source $V_{cc}$, the common emitter is connected to a reference potential point through a resistance $R_1$ and an input signal of a higher level of an input signal applied to a base input end x of the transistor $Q_1$ and an input signal applied to a base input end y of the transistor $Q_2$ is output from the common emitter of the transistors $Q_1$ and $Q_2$. By the way, even in the case of three or more input signals, in the same manner, three or more transistors $Q_1$, $Q_2$ and $Q_3$ may be connected in parallel as shown in FIG. 4B. Also, in this case, the input signal of the highest level among three input signals applied to the respective base input ends X, y and Z of the transistors $Q_1$, $Q_2$ and $Q_3$ is output from the common emitter.

Figure 5A:
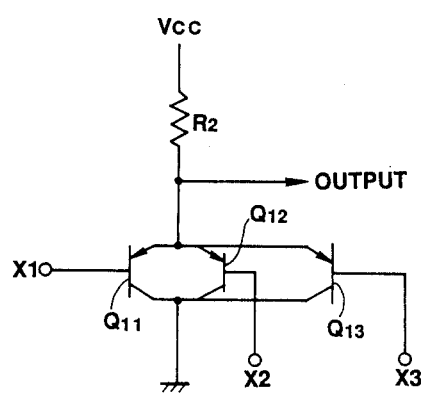
FIGS. 5A and 5B are circuit diagrams showing examples of a minimum value circuit used in the above mentioned intermediate value detecting circuit.
Figure 5B:
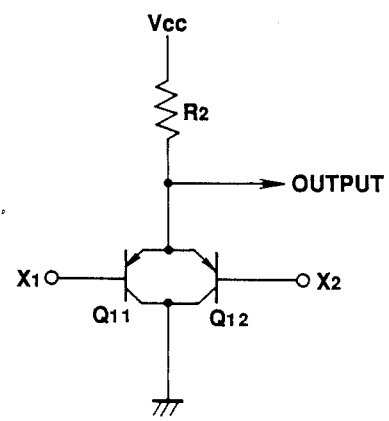

FIG. 5A is a circuit diagram showing an example of the above mentioned minimum value circuit 47 in which the common emitter of three PNP type transistors $Q_{11}$, $Q_{12}$ and $Q_{13}$ is connected to the direct voltage source $V_{cc}$ through a resistance $R_2$, the common collector is connected to the reference potential point and an input signal of the lowest level among three input signals applied to the respective base input ends $x_1$, $x_2$ and $x_3$ of the transistors $Q_{11}$, $Q_{12}$ and $Q_{13}$ is output from the common emitter. By the way, even in the case of two input signals, in the same manner, two transistors $Q_{11}$ and $Q_{12}$ may be connected in parallel as shown in FIG. 5B. Also, in this case, the input signal of a lower level between two input signals applied to the respective base input ends $X_1$ and $X_2$ of the transistors $Q_1$ and $Q_2$ is output from the common emitter.

The operation of the above mentioned circuit in FIG. 1 shall be explained with reference to FIG. 6. The waveforms in (a) to (n) in FIG. 6 correspond respectively to the waveforms at the respective points (a) to (n) shown in FIG. 1. However, the waveforms in the points (b) and (c) are omitted in the drawings.

Figure 6:
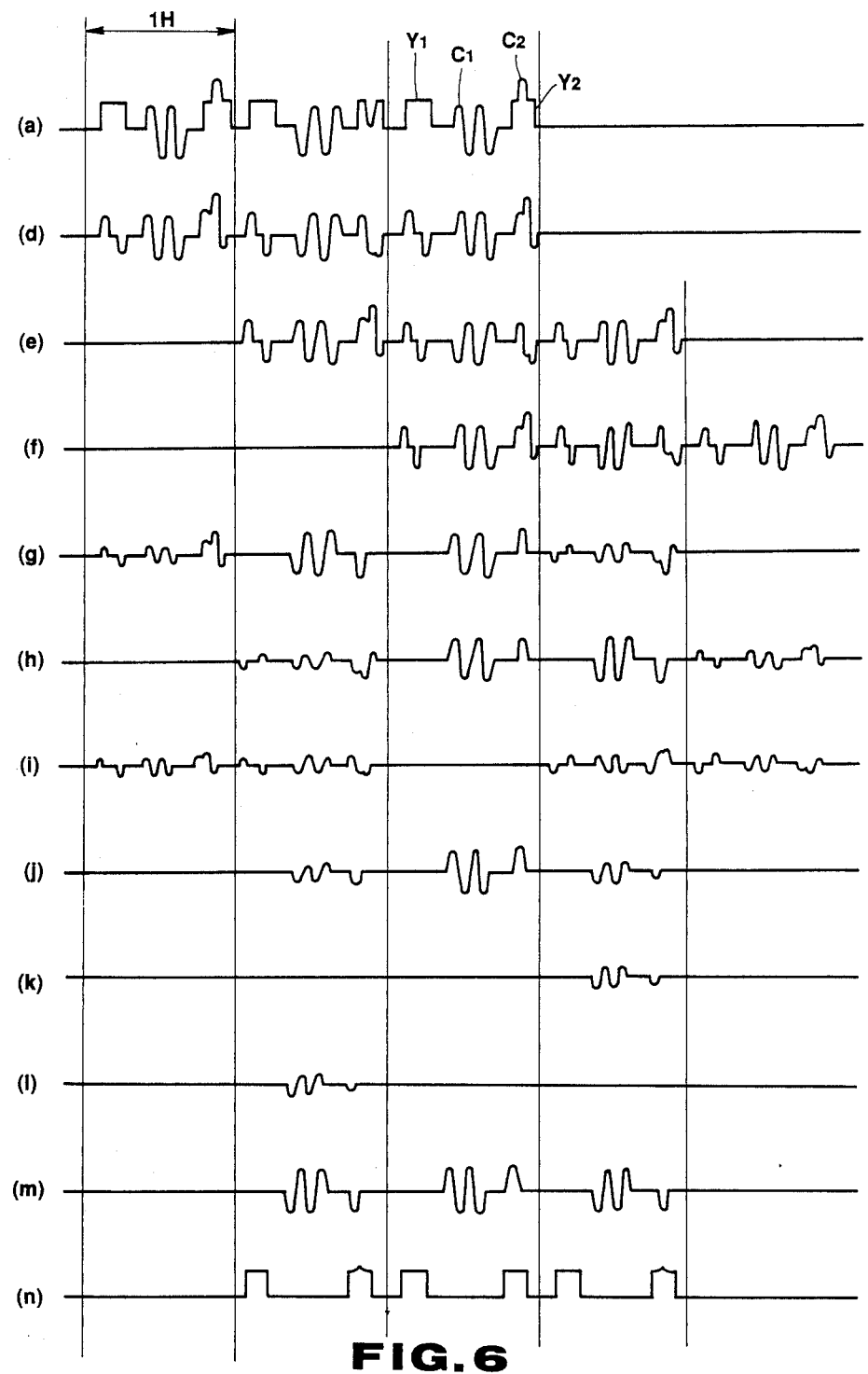
FIG. 6 is a waveform diagram for explaining the circuit operation in FIG. 1.

First of all, it is assumed that such composite video signal as is shown in FIG. 6(a) is input into the input terminal 11. Here, the composite video signal is represented in a combination of a luminance signal ($Y_1$). a chrominance signal ($C_1$) and signals ($Y_2+C_2$) of the edge part large in the luminance variation. For the sake of brevity, the synchronizing signal is omitted. Of the signals ($Y_2+C_2$) of the edge part, $Y_2$ represents a luminance component and $C_2$ represents a chrominance component. On the video signal part, as illustrated, this composite video signal has a part having no correlation and a part haveing a correlation before and after the 1H section. The output of the delay circuit 12 is delayed by 1H to be a signal (b) and is further delayed by 1H in the delay circuit 13 to be a signal (c). Although the signals (b) and (c) are not illustrated, they are delayed respectively by 1H and 2H from the signal (a). The respective signals of (a), (b) and (c) are limited in the band by the band pass filters 14, 15 and 16 to be such signals as are shown in ( d), (e) and (f) in FIG. 6. The signal (e) is inverted by the polarity inverting circuit 17, is then added to the above mentioned signal (d) in the adding circuit 18 and is further made ½ in the amplitude to be the signal shown in FIG. 6(g). The signal (e) is inverted by the polarity inverting circuit 17, is then added to the above mentioned signal (f) in the adding circuit 19 and is further made ½ in the amplitude to be the signal shown in FIG. 6(h). In the same manner, the signal (f) is inverted by the polarity inverting circuit 22, is then added to the above mentioned signal (d) in the adding circuit 23 and is further made ½ in the amplitude to be the signal shown in FIG. 6(i). The signals (g) and (h) and the reference direct current level signal (AC=0) of the terminal 21 are fed to the intermediate level signal as is shown in FIG. 6(j). The signal obtained by inverting the signal (i) in the polarity inverting circuit 26, the signal (g) and the reference direct current level signal (AC=0) of the terminal 25 are fed to the intermediate value detecting circuit 27 to be such intermediate level signal as is shown in FIG. 6(k). Further, the signals (i) and (h) and the reference direct current level signal (AC=0) of the terminal 28 are fed to the intermediate value detecting circuit 27 to be such intermediate level signal as is shown in FIG. 6(l). The signals (j), (k) and (l) are added in the adding circuit 29 to be the signal shown in FIG. 6(m). The signal of (m) is separated from the composite video signal without mixing the luminance components ($Y_1$ and $Y_2$) in the waveform to be a chrominance signal having no such deterioration as dulling even in a non-correlated part in the vertical direction.

The signal of (m) is also added to the signal of (b) by the adding circuit 31 to obtain the luminance signal shown in FIG. 6(n). The luminance signal (n) also has no chrominance signal mixed in and is a signal having no such deterioration as dulling even in a non-correlated part in the vertical direction.

Here, if the waveforms at the respective points (a) to (n) in FIG. 1 are represented by $vA$ to $vN$ and the luminance signal, the chrominance signal and the signal of the edge part are represented respectively by $Y_1$, $C_1$ and ($Y_2+C_2$), the 1Hth signal ($vA$) 1H of the input composite video signal $vA$ will be represented by $$(vA)1H = Y_1 + C_1 + Y_2 + C_2.$$

The 2hth signal ($vA$) 2H will be represented by $$(vA)2H = Y_1 - C_1 + Y_2 - C_2.$$

Also, if $vA$ to $vN$ are in a fuzzy collection, the output $\rho J$ of the intermediate value detecting circuit 20 will be represented as follows if AC=0 is represented by $\Phi$, $$vJ = (vG \vee \Phi) \wedge (\Phi \vee vH) \wedge (vH \vee vG)$$

$$\nabla MIS(vG, \Phi, vH) \ldots \quad (1)$$

wherein V represents a logical sum and $\Lambda$ represents a logical product.

Here, the signal correlated in the vertical direction shall be considered. If the components of $Y_1$, $C_1$, $Y_2$ and $C_2$ having passed through the band pass filters 14, 15 and 16 are represented by $Y_{1s}$, $C_{1s}$, $Y_{2s}$ and $C_{2s}$, the nHth signals of $vD$, $vE$ and $vF$ will be:

$$(vD)nH = Y_{1s} + C_{1s} + Y_{2s} + C_{2s}$$
$$(vE)nH = Y_{1s} - C_{1s} + Y_{2s} - C_{2s} \text{ and}$$
$$(vF)nH = Y_{1s} + C_{1s} + Y_{2s} + C_{2s},$$

therefore, $$(vG)nH = (\tfrac{1}{2})\{(vD)nH - (vE)nH\}$$
$$= C_{1s} + C_{2s}$$
$$(vH)nH = (\tfrac{1}{2})\{(vF)nH - (vE)nH\}$$
$$= C_{1s} + C_{2s} = (vG)nH$$
$$(vI)nH = (\tfrac{1}{2})\{(vD)nH - (vF)nH\}$$
$$= \phi$$

Therefore, $$(vJ)nH = \{(vG)nH \vee \phi\} \wedge \{\phi \vee (vG)nH\} \wedge$$
$$\{(vG)nH \vee (vG)nH\}$$
$$= (vG)nH$$
$$(vK)nH = \{(vG)nH \vee \phi\} \wedge (\phi \vee \phi) \wedge$$
$$\{(vG)nH \vee \phi\}$$
$$= \phi$$
$$(vL)nH = (\phi \vee \phi) \wedge \{\phi \vee (vG)nH\} \wedge$$
$$\{\phi \vee (vG)nH\}$$
$$= \phi.$$

As a result, $$(vM)nH = (vJ)nh + (vK)nH + (vL)nH$$
$$= C_{1s} + C_{2s}$$

and a chrominance signal in which no luminance signal is mixed is obtained.

Also, in the case of ($vF$) nH032 0, that is, in the part having no correlation in the vertical direction, $$(vG)nH = (\tfrac{1}{2})\{(vD)nH - (vE)nH\}$$
$$= C_{1s} + C_{2s}$$
$$(vH)nH = (\tfrac{1}{2})\{(vF)nH - (vE)nH\}$$
$$= (-\tfrac{1}{2})(Y_{1s} - C_{1s} + Y_{2s} - C_{2s})$$
$$(vI)nH = (\tfrac{1}{2})\{(vD)nH - (vF)nH\}$$
$$= (\tfrac{1}{2})(Y_{1s} + C_{1s} + Y_{2s} + C_{2s}).$$

Therefore, from the definition of the formula (1), $$(vJ)nH = MID\ \{C_{1s} + C_{2s}, \phi, (-\tfrac{1}{2}) \cdot$$
$$(Y_{1s} - C_{1s} + Y_{2s} - C_{2s})\}$$
$$= MID\ \{C_{1s}, \phi, (-\tfrac{1}{2})(Y_{1s} - C_{1s})\} +$$
$$MID\ \{C_{2s}, \phi, (-\tfrac{1}{2})(Y_{2s} - C_{2s})\}$$
$$= MID\ \{\phi, \phi, (-\tfrac{1}{2})\ Y_{1s}\} +$$
$$MID\ \{C_{1s}, \phi, (\tfrac{1}{2})\ C_{1s}\} +$$
$$MID\ \{C_{2s}, \phi, (-\tfrac{1}{2})(Y_{2s} - C_{2s})\}$$
$$= \phi + (\tfrac{1}{2})\ C_{1s} + MID\ \{C_{2s}, \phi,$$
$$(-\tfrac{1}{2})(Y_{2s} - C_{2s})\}.$$

In the same manner, $$(vK)nH = \phi + MID\ \{C_{2s}, \phi, (-\tfrac{1}{2})(Y_{2s} + C_{2s})\}$$
$$(vL)nH = \phi + (\tfrac{1}{2})C_{1s} + MID\ \{(\tfrac{1}{2})(Y_{2s} + C_{2s}), \phi,$$
$$(-\tfrac{1}{2})(Y_{2s} - C_{2s})\}.$$

Therefore, $$(vM)nH = (vJ)nH = (vK)nH + (vL)nH$$
$$= C_{1s} + \Delta.$$

Here, $$\Delta = MID\ \{C_{2s}, \phi, (-\tfrac{1}{2})(Y_{2s} - C_{2s})\} +$$
$$MID\ \{C_{2s}, \phi, (-\tfrac{1}{2})(Y_{2s} + C_{2s})\} +$$
$$MID\ \{(\tfrac{1}{2})(Y_{2s} + C_{2s}), \phi, (-\tfrac{1}{2})(Y_{2s} - C_{2s})\}.$$

That is to say, in the low band part of the luminance signal, the chrominance signal will be effectively separated. It is apparent that the error of Δ is limited to the case that there is no correlation in the vertical direction and the luminance signal is in a high band. In fact, the disadvantage is very small.

Also, in the case of $Y_{2s} \simeq C_{2s}$, $$\Delta \simeq MID\ (C_{2s}, \phi, \phi) +$$
$$MID\ (C_{2s}, \phi, -C_{2s}) + MID\ (C_{2s}, \phi, \phi) = \phi.$$

Thus, the error itself is small.

Figure 7:
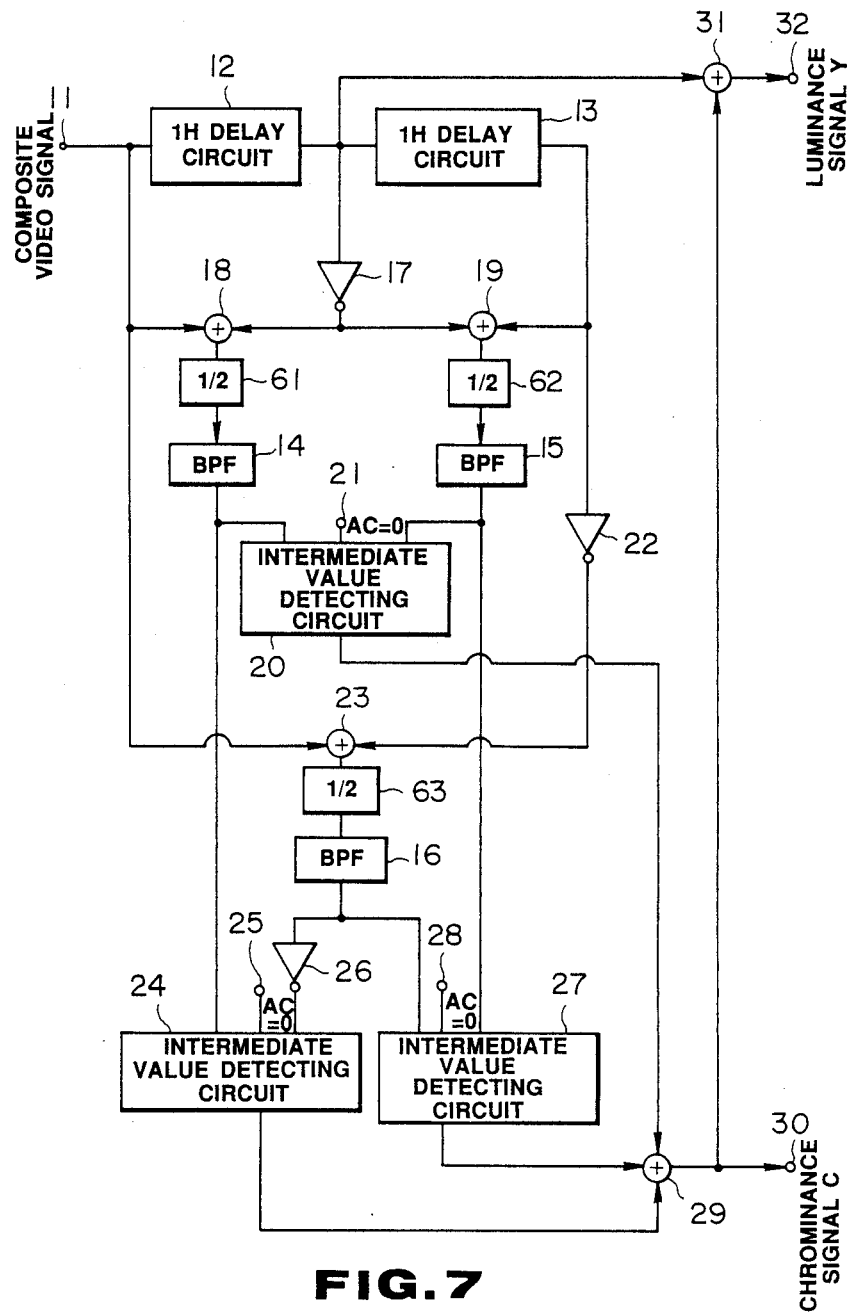
FIG. 7 is a block diagram showing the second embodiment of the present invention.

FIG. 7 is a block diagram showing the second embodiment of the present invention. The embodiment shown in FIG. 7 is substantially the same as in FIG. 1 but the band pass filters 14, 15 and 16 in FIG. 1 are arranged respectively in the steps after the adders 18, 19 and 23 in this embodiment. Even in such formation, the same effect as in the case of FIG. 1 can be obtained.

Figure 8:
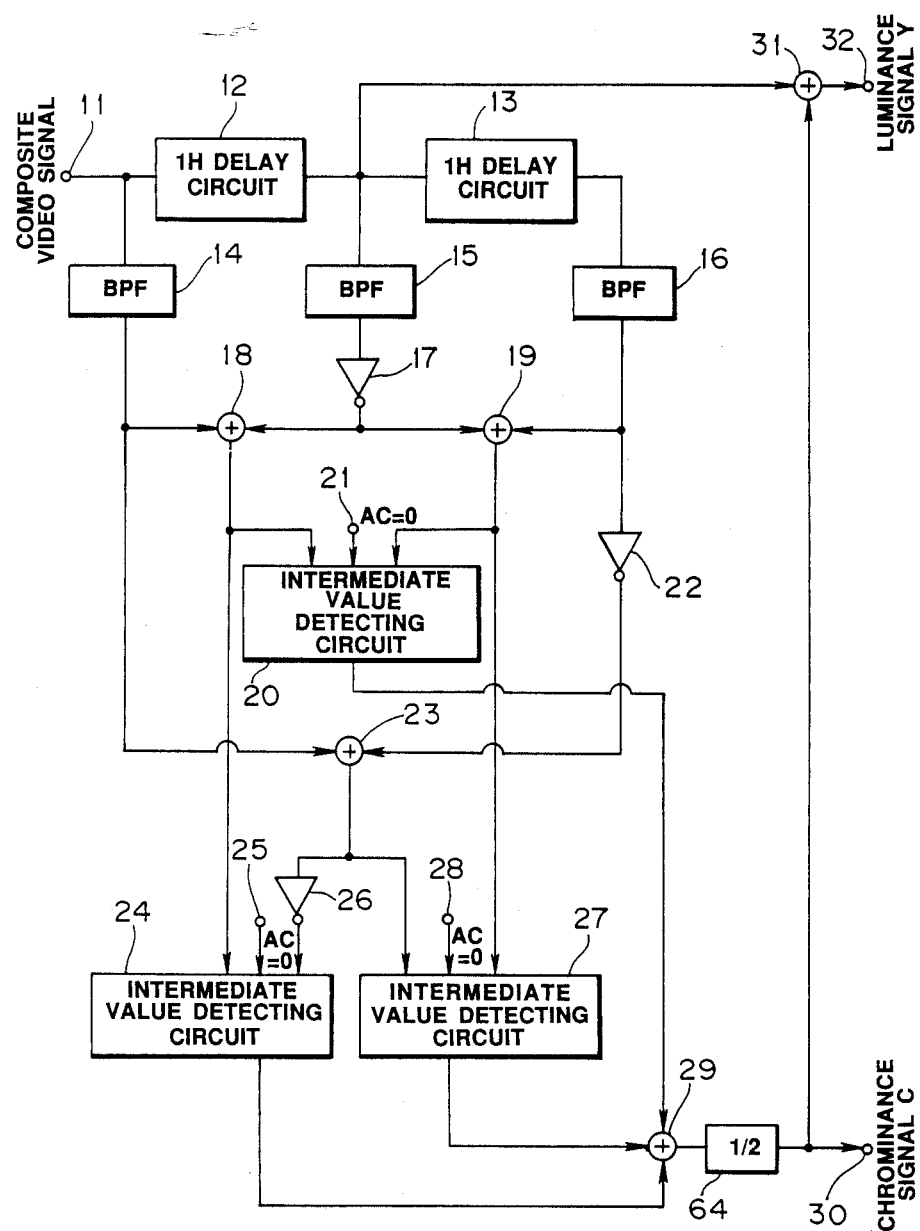
FIG. 8 is a block diagram showing the third embodiment of the present invention.
Figure 9:
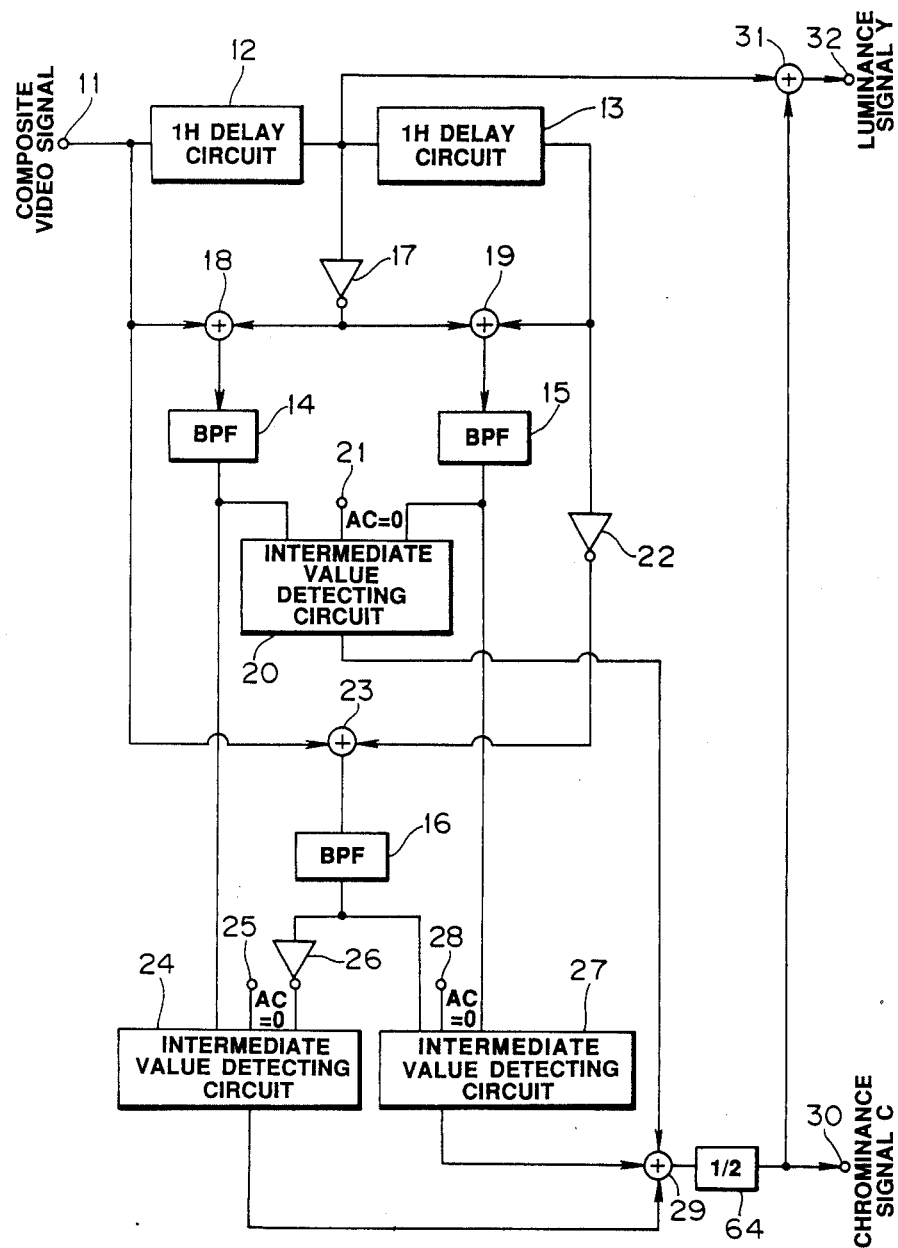
FIG. 9 is a block diagram showing the fourth embodiment of the present invention.

By the way, in the above mentioned embodiments in FIGS. 1 and 7, ½-gain attenuators 61, 62 and 63 are arranged respectively in the steps after the adding circuits 18, 19 and 23 but, instead of these three attenuators, a ½-attenuator 64 may be arranged as shown in FIGS. 8 and 9 after the adding circuit 29. FIG. 8 corresponds to FIG. 1 and FIG. 9 corresPonds to FIG. 7.

Also, besides the above described embodiments, the present invention can be variously modified without deviating from its subject matter.

As described above, according to the present invention, irrespective of whether the signals are correlated or not before and after the 1H, the luminance signal and chrominance signal can be effectively separated from each other, there is no obstruction by the cross talk of the luminance signal and chrominance signal with each other, the resolution in the vertical direction of the luminance signal and chrominance signal is not reduced and therefore the picture quality of the reproduced picture image can be improved. Particularly, even in the edge part of the video image in which the luminance variation is large, the chrominance signal component can be effectively separated.

What is claimed is:

1. A luminance signal and chrominance signal separating circuit comprising:

a first delaying means for delaying by one horizontal period an input composite video signal to obtain a first delay signal;

a first band pass means for inputting and passing said composite video signal near a color subcarrier frequency;

a second band pass means for inputting and passing said first delay signal near a color subcarrier frequency;

a first polarity inverting means for inverting the polarity of the output of said second band pass means;

a second delaying means for further delaying by one horizontal period said first delay signal to obtain a second delay signal;

a third band pass means for inputting and passing said second delay signal near a color subcarrier frequency;

a second polarity inverting means for inverting the polarity of the output of said third band pass means;

a first adding means for adding the output of said first band pass means and the output of said first polarity inverting means and making the added output ½;

a second adding means for adding the output of said first polarity inverting means and the output of said third band pass means and making the added output ½;

a third adding means for adding the output of said first band pass means and the output of said second polarity inverting means and making the added output ½;

a third polarity inverting means for inverting the polarity of the output of said third adding means;

a first intermediate value detecting means for inputting the output of said first adding means, the output of said second adding means and a reference direct current level signal having had the alternating current part removed and detecting an intermediate level of these signals;

a second intermediate value detecting means for inputting the output of said first adding means, the output of said third polarity inverting means and a reference direct current level signal having had the alternating current part removed and detecting an intermediate level of these signals;

a third intermediate value detecting means for inputting the output of said second adding means, the output of said third adding means and a reference direct current level signal having had the alternating current part removed and detecting an intermediate level of these signals;

a fourth adding means for adding the output of said first intermediate value detecting means, the output of said second intermediate value detecting means and the output of said third intermediate value detecting means to obtain a chrominance signal in which no luminance signal component is mixed; and a fifth adding means for adding the output of said fourth adding means to said first delay signal to obtain a luminance signal in which no chrominance signal component is mixed.

2. A luminance signal and chrominance signal separating circuit comprising:

a first delaying means for delaying by one horizontal period an input composite video signal to obtain a first delay signal;

a first polarity inverting means for inverting the polarity of said first delay signal;

a second delaying means for further delaying by one horizontal period said first delay signal to obtain a second delay signal;

a second polarity inverting means for inverting the polarity of said second delay signal;

a first adding means for adding said input composite video signal and the output of said first polarity inverting means and making said added output ½;

a second adding means for adding said second delay signal and the output of said first polarity inverting means and making said added output ½;

a third adding means for adding said input composite video signal and the output of said second polarity inverting means and making said added output ½;

a first band pass means for inputting and passing the output of said first adding means near a color subcarrier frequency;

a second band pass means for inputting and passing the output of said second adding means near a color subcarrier frequency;

a third band pass means for inputting and passing the output of said third adding means near a color subcarrier frequency;

a third polarity inverting means for inverting the polarity of the output of said third band pass means;

a first intermediate value detecting means for inputting the output of said first band pass means, the output of said second band pass means and a reference direct current level signal having had the alternating current part removed to detect an intermediate level of these signals;

a second intermediate value detecting means for inputting the output of said first band pass means, the output of said third polarity inverting means and a reference direct current level signal having had the alternating current part removed to detect an intermediate level of these signals;

a third intermediate value detecting means for inputting the output of said second band pass means, the output of said third band pass means and a reference direct current level signal having had the alternating current part removed to detect an intermediate level of these signals;

a fourth adding means for adding the output of said first intermediate value detecting means, the output of said second intermediate value detecting means and the output of said third intermediate value detecting means to obtain a chrominance signal in which no luminance signal component is mixed; and a fifth adding means for adding the output of said fourth adding means to said first delay signal to obtain a luminance signal in which no chrominance signal component is mixed.

3. A luminance signal and chrominance signal separating circuit comprising:

a first delaying means for delaying by one horizontal period an input composite video signal to obtain a first delay signal;

a first band pass means for inputting and passing said composite video signal near a color subcarrier frequency;

a second band pass means for inputting and passing said first delay signal near a color subcarrier frequency;

a first polarity inverting means for inverting the polarity of the output of said second band pass means;

a second delaying means for further delaying said first delay signal by one horizontal period to obtain a second delay signal;

a third band pass means for inputting and passing said second delay signal near a color subcarrier frequency;

a second polarity inverting means for inverting the polarity of the output of said third band pass means;

a first adding means for adding the output of said first band pass means and the output of said first polarity inverting means;

a second adding means for adding the output of said first polarity inverting means and the output of said third band pass means;

a third adding means for adding the output of said first band pass means and the output of said second polarity inverting means;

a third polarity inverting means for inverting the polarity of the output of said third adding means;

a first intermediate value detecting means for inputting the output of said first adding means, the output of said second adding means and a reference direct current level signal having had the alternating current part removed to detect an intermediate level of these signals;

a second intermediate value detecting means for inputting the output of said first adding means, the output of said third polarity inverting means and a reference direct current level signal having had the alternating current part removed to detect an intermediate level of these signals;

a third intermediate value detecting means for inputting the output of said second adding means, the output of said third adding means and a reference direct current level signal having had the alternating current part removed to detect an intermediate level of these signals;

a fourth adding means for adding the output of said first intermediate value detecting means, the output of said second intermediate value detecting means and the output of said third intermediate value detecting means and making the added output ½ to obtain a chrominance signal in which no luminance signal component is mixed; and a fifth adding means for adding the output of said fourth adding means to said first delay signal to obtain a luminance signal in which no chrominance signal component is mixed.

4. A luminance signal and chrominance signal separating circuit comprising:

a first delaying means for delaying by one horizontal period an input composite video signal to obtain a first delay signal;

a first polarity inverting means for inverting the polarity of said first delay signal;

a second delaying means for further delaying by one horizontal period said first delay signal to obtain a second delay signal;

a second polarity inverting means for inverting the polarity of said second delay signal;

a first adding means for adding said input composite video signal and the output of said first polarity inverting means;

a second adding means for adding said second delay signal and the output of said first polarity inverting means;

a third adding means for adding said input composite video signal and the output of said second polarity inverting means;

a first band pass means for inputting and passing the output of said first adding means near a color subcarrier frequency;

a second band pass means for inputting and passing the output of said second adding means near a color subcarrier frequency;

a third band pass means for inputting and passing the output of said third adding means near a color subcarrier frequency;

a third polarity inverting means for inverting the polarity of the output of said third band pass means;

a first intermediate value detecting means for inputting the output of said first band pass means, the output of said second band pass means and a reference direct current level signal having had the alternating current part removed to detect an intermediate level of these signals;

a second intermediate value detecting means for inputting the output of said first band pass means, the output of said third polarity inverting means and a reference direct current level signal having had the alternating current part removed to detect an intermediate level of these signals;

a third intermediate value detecting means for inputting the output of said second band pass means, the output of said third band pass means and a reference direct current level signal having had the alternating current part removed to detect an intermediate level of these signals;

a fourth adding means for adding the output of said first intermediate value detecting means, the output of said second intermediate value detecting means and the output of said third intermediate value detecting means and making the added output $\frac{1}{2}$ to obtain a chrominance signal in which no luminance signal component is mixed; and a fifth adding means for adding the output of said fourth adding means to said first delay signal to obtain a luminance signal in which no chrominance signal component is mixed.

5. A luminance signal and chrominance signal separating circuit according to claim 1 wherein said first adding means comprises:

an adder for adding the output of said first band pass means and the output of said first polarity inverting means; and an attenuator for making the output of said adder $\frac{1}{2}$.

6. A luminance signal and chrominance signal separating circuit according to claim 1 wherein said second adding means comprises:

an adder for adding the output of said first polarity inverting means and the output of said third band pass means; and an attenuator for making the output of said adder $\frac{1}{2}$.

7. A luminance signal and chrominance signal separating circuit according to claim 1 wherein said third adding means comprises:

an adder for adding the output of said first band pass means and the output of said second polarity inverting means; and an attenuator for making the output of said adder $\frac{1}{2}$.

8. A luminance signal and chrominance signal separating circuit according to claim 2 wherein said first adding means comprises:

an adder for adding said input composite video signal and the output of said first polarity inverting means; and an attenuator for making the output of said adder $\frac{1}{2}$.

9. A luminance signal and chrominance signal separating circuit according to claim 2 wherein said second adding means comprises:

an adder for adding said second delay signal and the output of said first polarity inverting means; and an attenuator for making the output of said adder $\frac{1}{2}$.

10. A luminance signal and chrominance signal separating circuit according to claim 2 wherein said third adding means comprises:

an adder for adding said input composite video signal and the output of said second polarity inverting means; and an attenuator for making the output of said adder $\frac{1}{2}$.

11. A luminance signal and chrominance signal separating means according to claim 3 or 4 wherein said fourth adding means comprises:

an adder for adding the output of said first intermediate value detecting means, the output of said second intermediate value detecting means and the output of said third intermediate value detecting means; and an attenuator for making the output of said adder $\frac{1}{2}$ to obtain a chrominance signal in which no luminance signal component is mixed.

12. A luminance signal and chrominance signal separating circuit according to claim 1 or 3 wherein said first intermediate value detecting means comprises:

a first input terminal for receiving the output of said first adding means;

a second input terminal for receiving the output of said second adding means;

a control signal terminal to which a reference direct current level signal having had the alternating current part removed is to be fed;

a first maximum value circuit for receiving the signal fed to said first input terminal and the control signal fed to said control signal terminal and selectively outputting a signal of a higher level of said signals;

a second maximum value circuit for receiving the signal fed to said second input terminal and the control signal fed to said control signal terminal and selectively outputting a signal of a higher level of said signals;

a third maximum value circuit for receiving the signal fed to said first input terminal and the signal fed to said second second input terminal and selectively outputting a signal of a higher level of said signals; and a minimum value circuit for receiving the outputs of said first to third maximum value circuits and selectively outputting a signal of the lowest level of said signals.

13. A luminance signal and chrominance signal separating circuit according to claim 1 or 3 wherein said second intermediate value detecting means comprises:

a first input terminal for receiving the output of said first adding means;

a second input terminal for receiving the output of said third polarity inverting means;

a control signal terminal to which a reference direct current level signal having had the alternating current part removed is to be fed;

a first maximum value circuit for receiving the signal fed to said first input terminal and the control signal fed to said control signal terminal and selectively outputting a signal of a higher level of said signals;

a second maximum value circuit for receiving the signal fed to said second input terminal and the control signal fed to said control signal terminal and selectively outputting a signal of a higher level of said signals;

a third maximum value circuit for receiving the signal fed to said first input terminal and the signal fed to said second input terminal and selectively outputting a signal of a higher level of said signals; and a minimum value circuit for receiving the outputs of said first to third maximum value circuits and selectively outputting a signal of the lowest level of said signals.

14. A luminance signal and chrominance signal separating circuit according to claim 1 or 5 wherein said third intermediate value detecting means comprises:

a first input terminal for receiving the output of said second adding means;

a second input terminal for receiving the output of said third adding means;

a control signal terminal to which a reference direct current level signal having had the alternating current part removed is to be fed;

a first maximum value circuit for receiving the signal fed to said first input terminal and the control signal fed to said control signal terminal and selectively outputting a signal of a higher level of said signals;

a second maximum value circuit for receiving the signal fed to said second input terminal and the control signal fed to said control signal terminal and selectively outputting a signal of a higher level of said signals;

a third maximum value circuit for receiving the signal fed to said first input terminal and the signal fed to said second input terminal and selectively outputting a signal of a higher level of said signals; and a minimum value circuit for receiving the outputs of said first to third maximum value circuits and selectively outputting a signal of the lowest level of said signals.

15. A luminance signal and chrominance signal separating circuit according to claim 2 or 4 wherein said first intermediate value detecting means comprises:

a first input terminal for receiving the output of said first band pass means;

a second input terminal for receiving the output of said second band pass means;

a control signal terminal to which a reference direct current level signal having had the direct current part removed is to be fed;

a first maximum value circuit for receiving the signal fed to said first input terminal and the control signal fed to said control signal terminal and selectively outputting a signal of a higher level of said signals;

a second maximum value circuit for receiving the signal fed to said second input terminal and the control signal fed to said control signal terminal and selectively outputting a signal of a higher level of said signals;

a third maximum value circuit for receiving the signal fed to said first input terminal and the signal fed to said second input terminal and selectively outputting a signal of a higher level of said signals; and a minimum value circuit for receiving the outputs of said first to third maximum value circuits and selectively outputting a signal of the lowest level of said signals.

16. A luminance signal and chrominance signal separating circuit according to claim 2 or 4 wherein said second intermediate value detecting means comprises:

a first input terminal for receiving the output of said first band pass means;

a second input terminal for receiving the output of said third polarity inverting means;

a control signal terminal to which a reference direct current level signal having had the alternating current part removed is to be fed;

a first maximum value circuit for receiving the signal fed to said first input terminal and the control signal fed to said control signal terminal and selectively outputting a signal of a higher level of said signals;

a second maximum value circuit for receiving the signal fed to said second input terminal and the control signal fed to said control signal terminal and selectively outputting a signal of a higher level of said signals;

a third maximum value circuit for receiving the signal fed to said first input terminal and the signal fed to said second input terminal and selectively outputting a signal of a higher level of said signals; and a minimum value circuit for receiving the outputs of said first to third maximum value circuits and selectively outputting a signal of the lowest level of said signals.

17. A luminance signal and chrominance signal separating circuit according to claim 2 or 4 wherein said third intermediate value detecting means comprises:

a first input terminal for receiving the output of said second band pass means;

a second input terminal for receiving the output of said third band pass means;

a control signal terminal to which a reference direct current level signal having had the alternating current part removed is to be fed;

a first maximum value circuit for receiving the signal fed to said first input terminal and the control signal fed to said control signal terminal and selectively outputting a signal of a higher level of said signals;
a second maximum value circuit for receiving the signal fed to said second input terminal and the control signal fed to said control signal terminal and selectively outputting a signal of a higher level of said signals;
a third maximum value circuit for receiving the signal fed to said first input terminal and the signal fed to said second input terminal and selectively outputting a signal of a higher level of said signals; and
a minimum value circuit for receiving the outputs of said first to third maximum value circuits and selectively outputting a signal of the lowest level of said signals.

18. A luminance signal and chrominance signal separating circuit according to claim 1 or 3 wherein said first intermediate value detecting means comprises:
a first input terminal for receiving the output of said first adding means;
a second input terminal for receiving the output of said second adding means;
a control signal terminal to which a reference direct current level signal having had the alternating current part removed is to be fed;
a first minimum value circuit for receiving the signal fed to said first input terminal and the control signal fed to said control signal terminal and selectively outputting a signal of a lower level of said signals;
a second minimum value circuit for receiving the signal fed to said second input terminal and the control signal fed to said control signal terminal and selectively outputting a signal of a lower level of said signals;
a third minimum value circuit for receiving the signal fed to said first input terminal and the signal fed to said second input terminal and selectively outputting a signal of a lower level of said signals; and
a maximum value circuit for receiving the outputs of said first to third minimum value circuits and selectively outputting a signal of the highest level of said signals.

19. A luminance signal and chrominance signal separating circuit according to claim 1 or 3 wherein said second intermediate value detecting means comprises:
a first input terminal for receiving the output of said first adding means;
a second input terminal for receiving the output of said third polarity inverting means;
a control signal terminal to which a reference direct current level signal having had the alternating current part removed is to be fed;
a first minimum value circuit for receiving the signal fed to said first input terminal and the control signal fed to said control signal terminal and selectively outputting a signal of a lower level of said signals;
a second minimum value circuit for receiving the signal fed to said second input terminal and the control signal fed to said control signal terminal and selectively outputting a signal of a lower level of said signals;
a third minimum value circuit for receiving the signal fed to said first input terminal and the signal fed to said second input terminal and selectively outputting a signal of a lower level of said signals; and
a maximum value circuit for receiving the outputs of said first to third minimum value circuits and selectively outputting a signal of the highest level of said signals.

20. A luminance signal and chrominance signal separating circuit according to claim 1 or 3 wherein said third intermediate value detecting means comprises:
a first input terminal for receiving the output of said second adding means;
a second input terminal for receiving the output of said third adding means;
a control signal terminal to which a reference direct current level signal having had the alternating current part removed is to be fed;
a first minimum value circuit for receiving the signal fed to said first input terminal and the control signal fed to said control signal terminal and selectively outputting a signal of a lower level of said signals;
a second minimum value circuit for receiving the signal fed to said second input terminal and the control signal fed to said control signal terminal and selectively outputting a signal of a lower level of said signals;
a third minimum value circuit for receiving the signal fed to said first input terminal and the signal fed to said second input terminal selectively outputting a signal of a lower level of said signals; and
a maximum value circuit for receiving the outputs of said first to third minimum value circuits and selectively outputting a signal of the highest level of said signals.

21. A luminance signal and chrominance signal separating circuit according to claim 2 or 4 wherein said first intermediate value detecting means comprises:
a first input terminal for receiving the output of said first band pass means;
a second input terminal for receiving the output of said second band pass means;
a control signal terminal to which a reference direct current level signal having had the alternating current part removed is to be fed;
a first minimum value circuit for receiving the signal fed to said control signal terminal and the control signal fed to said control signal terminal and selectively outputting a signal of a lower level of said signals;
a second minimum value circuit for receiving the signal fed to said second input terminal and the control signal fed to said control signal terminal and selectively outputting a signal of a lower level of said signals;
a third minimum value circuit for receiving the signal fed to said first input terminal and the signal fed to said second input terminal and selectively outputting a signal of a lower level of said signals; and
a maximum value circuit for receiving the outputs of said first to third minimum value circuits and selectively outputting a signal of the highest level of said signals.

22. A luminance signal and chrominance signal separating circuit according to claim 2 or 4 wherein said second intermediate value detecting means comprises:
a first input terminal for receiving the output of said first band pass means;
a second input terminal for receiving the output of said third polarity inverting means;

a control signal terminal to which a reference direct current level signal having had the alternating current part removed is to be fed;

a first minimum value circuit for receiving the signal fed to said first input terminal and the control signal fed to said control signal terminal and selectively outputting a signal of a lower level of said signals;

a second minimum value circuit for receiving the signal fed to said second input terminal and the control signal fed to said control signal terminal and outputting a signal of a lower level of said signals;

a third minimum value circuit for receiving the signal fed to said first input terminal and the signal fed to said second input terminal and selectively outputting a signal of a lower level of said signals; and a maximum value circuit for receiving the outputs of said first to third minimum value circuits and selectively outputting a signal of the highest level of said signals.

23. A luminance signal and chrominance signal separating circuit according to claim 2 or 4 wherein said third intermediate value detecting means comprises:

a first input terminal for receiving the output of said second band pass means;

a second input terminal for receiving the output of said third band pass means;

a control signal terminal to which a reference direct current level signal having had the alternating current part removed is to be fed;

a first minimum value circuit for receiving the signal fed to said first input terminal and the control signal fed to said control signal terminal and selectively outputting a signal of a lower level of said signals;

a second minimum value circuit for receiving the signal fed to said second input terminal and the control signal fed to said control signal terminal and selectively outputting a signal of a lower level of said signals;

a third minimum value circuit for receiving the signal fed to said first input terminal and the signal fed to said second input terminal and selectively outputting a signal of a lower level of said signals; and a maximum value circuit for receiving the outputs of said first to third minimum value circuits and selectively outputting a signal of the highest level of said signals.

24. A luminance signal and chrominance signal separating circuit according to claim 12 wherein said first, second or third maximum value circuit is of a formation in which:

the respective collectors of the first and second NPN type transistors are connected in common, the respective emitters are also connected in common, the common collector is connected to a direct voltage source, the common emitter is connected to a reference potential point through a resistance, one input signal is applied to the base of said first transistor and the other input signal is applied to the base of said second transistor so that an input signal of a higher level of these input signals may be output from the common emitter of said first and second transistors.

25. A luminance signal and chrominance signal separating circuit according to claim 12 wherein said minimum value circuit is of a formation in which:

the respective emitters of the first, second and third PNP type transistors are connected in common, the respective collectors are also connected in common, the common emitter is connected to a direct voltage source through a resistance, the common collector is connected to a reference potential point and three input signals are applied to the respective bases of said first, second and third transistors so that an input signal of the lowest level of these input signals may be output from the common emitter of said first, second and third transistors.

26. A luminance signal and chrominance signal separating circuit according to claim 18 wherein said first, second or third minimum value circuit is of a formation in which:

the respective emitters of the first and second PNP type transistors are connected in common, the respective collectors are also connected in common, the common emitter is connected to a direct voltage source through a resistance, the common collector is connected to a reference potential point, one input signal is applied to the base of said first transistor and the other input signal is applied to the base of said second transistor so that an input signal of a lower level of these input signals may be output from the common emitter of said first and second transistors.

27. A luminance signal and chrominance signal separating circuit according to claim 18 wherein said maximum value circuit is of a formation in which:

the respective collectors of the first, second and third NPN type transistors are connected in common, the respective emitters are also connected in common, the common collector is connected to a direct voltage source, the common emitter is connected to a reference potential point through a resistance and three input signals are applied to the respective bases of said first, second and third transistors so that an input signal of the highest level of these input signals may be output from the common emitter of said first, second and third transistors.

28. A luminance signal and chrominance signal separating circuit according to claim 13 wherein said first, second or third maximum value circuit is of a formation in which:

the respective collectors of the first and second NPN type transistors are connected in common, the respective emitters are also connected in common, the common collector is connected to a direct voltage source, the common emitter is connected to a reference potential point through a resistance, one input signal is applied to the base of said first transistor and the other input signal is applied to the base of said second transistor so that an input signal of a higher level of these input signals may be output from the common emitter of said first and second transistors.

29. A luminance signal and chrominance signal separating circuit according to claim 14 wherein said first, second or third maximum value circuit is of a formation in which:

the respective collectors of the first and second NPN type transistors are connected in common, the respective emitters are also connected in common, the common collector is connected to a direct voltage source, the common emitter is connected to a reference potential point through a resistance, one input signal is applied to the base of said first transistor and the other input signal is applied to the base of said second transistor so that an input signal of a higher level of these input signals may be output from the common emitter of said first and second transistors.

30. A luminous signal and chrominance signal separating circuit according to claim 15 wherein said first, second or third maximum value circuit is of a formation in which:

the respective collectors of the first and second NPN type transistors are connected in common, the respective emitters are also connected in common, the common collector is connected to a direct voltage source, the common emitter is connected to a reference potential point through a resistance, one input signal is applied to the base of said first transistor and the other input signal is applied to the base of said second transistor so that an input signal of a higher level of these input signals may be output from the common emitter of said first and second transistors.

31. A luminance signal and chrominance signal separating circuit according to claim 16 wherein said first, second or third maximum value circuit is of a formation in which:

the respective collectors of the first and second NPN type transistors are connected in common, the respective emitters are also connected in common, the common collector is connected to a direct voltage source, the common emitter is connected to a reference potential point through a resistance, one input signal is applied to the base of said first transistor and the other input signal is applied to the base of said second transistor so that an input signal of a higher level of these input signals may be output from the common emitter of said first and second transistors.

32. A luminance signal and chrominance signal separating circuit according to claim 17 wherein said first, second or third maximum value circuit is of a formation in which:

the respective collectors of the first and second NPN type transistors are connected in common, the respective emitters are also connected in common, the common collector is connected to a direct voltage source, the common emitter is connected to a reference potential point through a resistance, one input signal is applied to the base of said first transistor and the other input signal is applied to the base of said second transistor so that an input signal of a higher level of these input signals may be output from the common emitter of said first and second transistors.

33. A luminance signal and chrominance signal separating circuit according to claim 13 wherein said minimum value circuit is of a formation in which:

the respective emitters of the first, second and third PNP type transistors are connected in common, the respective collectors are also connected in common, the common emitter is connected to a direct voltage source through a resistance, the common collector is connected to a reference potential point and three input signals are applied to the respective bases of said first, second and third transistors so that an input signal of the lowest level of these input signals may be output from the common emitter of said first, second and third transistors.

34. A luminance signal and chrominance signal separating circuit according to claim 14 wherein said minimum value circuit is of a formation in which:

the respective emitters of the first, second and third PNP type transistors are connected in common, the respective collectors are also connected in common, the common emitter is connected to a direct voltage source through a resistance, the common collector is connected to a reference potential point and three input signals are applied to the respective bases of said first, second and third transistors so that an input signal of the lowest level of these input signals may be output from the common emitter of said first, second and third transistors.

35. A luminance signal and chrominance signal separating circuit according to claim 15 wherein said minimum value circuit is of a formation in which:

the respective emitters of the first, second and third PNP type transistors are connected in common, the respective collectors are also connected in common, the common emitter is connected to a direct voltage source through a resistance, the common collector is connected to a reference potential point and three input signals are applied to the respective bases of said first, second and third transistors so that an input signal of the lowest level of these input signals may be output from the common emitter of said first, second and third transistors.

36. A luminance signal and chrominance signal separating circuit according to claim 16 wherein said minimum value circuit is of a formation in which:

the respective emitters of the first, second and third PNP type transistors are connected in common, the respective collectors are also connected in common, the common emitter is connected to a direct voltage source through a resistance, the common collector is connected to a reference potential point and three input signals are applied to the respective bases of said first, second and third transistors so that an input signal of the lowest level of these input signals may be output from the common emitter of said first, second and third transistors.

37. A luminance signal and chrominance signal separating circuit according to claim 17 wherein said minimum value circuit is of a formation in which:

the respective emitters of the first, second and third PNP type transistors are connected in common, the respective collectors are also connected in common, the common emitter is connected to a direct voltage source through a resistance, the common collector is connected to a reference potential point and three input signals are applied to the respective bases of said first, second and third transistors so that an input signal of the lowest level of these input signals may be output from the common emitter of said first, second and third transistors.

38. A luminance signal and chrominance signal separating circuit according to claim 19 wherein said first, second or third minimum value circuit is of a formation in which:

the respective emitters of the first and second PNP type transistors are connected in common, the respective collectors are also connected in common, the common emitter is connected to a direct voltage source through a resistance, the common collector is connected to a reference potential point, one input signal is applied to the base of said first transistor and the other input signal is applied to the base of said second transistor so that an input signal of a lower level of these input signals may be output from the common emitter of said first and second transistors.

39. A luminance signal and chrominance signal separating circuit according to claim 20 wherein said first, second or third minimum value circuit is of a formation in which:

the respective emitters of the first and second PNP type transistors are connected in common, the respective collectors are also connected in common, the common emitter is connected to a direct voltage source through a resistance, the common collector is connected to a reference potential point, one input signal is applied to the base of said first transistor and the other input signal is applied to the base of said second transistor so that an input signal of a lower level of these input signals may be output from the common emitter of said first and second transistors.

40. A luminance signal and chrominance signal separating circuit according to claim 21 wherein said first, second or third minimum value circuit is of a formation in which:

the respective emitters of the first and second PNP type transistors are connected in common, the respective collectors are also connected in common, the common emitter is connected to a direct voltage source through a resistance, the common collector is connected to a reference potential point, one input signal is applied to the base of said first transistor and the other input signal is applied to the base of said second transistor so that an input signal of a lower level of these input signals may be output from the common emitter of said first and second transistors.

41. A luminance signal and chrominance signal separating circuit according to claim 22 wherein said first, second or third minimum value circuit is of a formation in which:

the respective emitters of the first and second PNP type transistors are connected in common, the respective collectors are also connected in common, the common emitter is connected to a direct voltage source through a resistance, the common collector is connected to a reference potential point, one input signal is applied to the base of said first transistor and the other input signal is applied to the base of said second transistor so that an input signal of a lower level of these input signals may be output from the common emitter of said first and second transistors.

42. A luminance signal and chrominance signal separating circuit according to claim 23 wherein said first, second or third minimum value circuit is of a formation in which:

the respective emitters of the first and second PNP type transistors are connected in common, the respective collectors are also connected in common, the common emitter is connected to a direct voltage source through a resistance, the common collector is connected to a reference potential point, one input signal is applied to the base of said first transistor and the other input signal is applied to the base of said second transistor so that an input signal of a lower level of these input signals may be output from the common emitter of said first and second transistors.

43. A luminance signal and chrominance signal separating circuit according to claim 19 wherein said maximum value circuit is of a formation in which:

the respective collectors of the first, second and third NPN type transistors are connected in common, the respective emitters are also connected in common, the common collector is connected to a direct voltage source, the common emitter is connected to a reference potential point through a resistance and three input signals are applied to the respective bases of said first, second and third transistors so that an input signal of the highest level of these input signals may be output from the common emitter of said first, second and third transistors.

44. A luminance signal and chrominance signal separating circuit according to claim 20 wherein said maximum value circuit is of a formation in which:

the respective collectors of the first, second and third NPN type transistors are connected in common, the respective emitters are also connected in common, the common collector is connected to a direct voltage source, the common emitter is connected to a reference potential point through a resistance and three input signals are applied to the respective bases of said first, second and third transistors so that an input signal of the highest level of these input signals may be output from the common emitter of said first, second and third transistors.

45. A luminance signal and chrominance signal separating circuit according to claim 21 wherein said maximum value circuit is of a formation in which:

the respective collectors of the first, second and third NPN type transistors are connected in common, the respective emitters are also connected in common, the common collector is connected to a direct voltage source, the common emitter is connected to a reference potential point through a resistance and three input signals are applied to the respective bases of said first, second and third transistors so that an input signal of the highest level of these input signals may be output from the common emitter of said first, second and third transistors.

46. A luminance signal and chrominance signal separating circuit according to claim 22 wherein said maximum value circuit is of a formation in which:

the respective collectors of the first, second and third NPN type transistors are connected in common, the respective emitters are also connected in common, the common collector is connected to a direct voltage source, the common emitter is connected to a reference potential point through a resistance and three input signals are applied to the respective bases of said first, second and third transistors so that an input signal of the highest level of these input signals may be output from the common emitter of said first, second and third transistors.

47. A luminance signal and chrominance signal separating circuit according to claim 23 wherein said maximum value circuit is of a formation in which:

the respective collectors of the first, second and third NPN type transistors are connected in common, the respective emitters are also connected in common, the common collector is connected to a direct voltage source, the common emitter is connected to a reference potential point through a resistance and three input signals are applied to the respective bases of said first, second and third transistors so that an input signal of the highest level of these input signals may be output from the common emitter of said first, second and third transistors.

* * * * *